United States Patent [19]

Iwata et al.

[11] Patent Number: 4,995,709
[45] Date of Patent: Feb. 26, 1991

[54] OPTICAL COLLIMATOR

[75] Inventors: Kazuo Iwata; Takuma Satou; Satoru Shibata, all of Gunma, Japan

[73] Assignee: Mitsubishi Denki Kabushiki Kaisha, Tokyo, Japan

[21] Appl. No.: 376,413

[22] Filed: Jul. 5, 1989

[30] Foreign Application Priority Data

Jul. 15, 1988 [JP] Japan ................................. 63-175217

[51] Int. Cl.⁵ ............................................. G02B 27/00
[52] U.S. Cl. ................................................... 350/447
[58] Field of Search ......................................... 350/447

[56] References Cited

FOREIGN PATENT DOCUMENTS 2359104 6/1975 Fed. Rep. of Germany ...... 350/447

OTHER PUBLICATIONS

Offner, "Method for Obtaining a Flat Field with Rosin-Amon Tilted Plane Correctors, Applied Optics", vol. 3, No. 2, 2/1974, p. 242.

Primary Examiner—Bruce Y. Arnold
Assistant Examiner—Rebecca D. Gass
Attorney, Agent, or Firm—Birch, Stewart, Kolasch & Birch

[57] ABSTRACT

An optical collimator having a collimator lens which is divided into front and rear collimator lenses. An inclined transparent parallel plate is located between the two collimator lenses, whereby the optical collimator is substantially free from comatic aberration and results in a collimator which can be reduced in size.

10 Claims, 1 Drawing Sheet

OPTICAL COLLIMATOR

BACKGROUND OF THE INVENTION

This invention relates to an optical collimator in a data reading device such as a bar code reader, and more particularly to miniaturization of the optical collimator.

A conventional optical collimator, as shown in FIG. 3, comprises: a light source 1 such as a semiconductor laser; a flat glass plate 2; a collimator lens 3; and a holder 4 holding the glass plate 2 and the collimator lens 3.

The light source 1 emits light having an astigmatism and a divergent angle. It is desirable that rays of light outputted by an optical collimator are substantially parallel and have no astigmatic difference. Therefore, it is necessary for the optical collimator to have a function of connecting the astigmatism and converting diverging rays of light into parallel rays of light.

In FIG. 3, in order to correct the astigmatism, the glass plate 2 is held in a inclined position between the light source 1 and the collimator lens 3.

In general, when a flat plate having a thickness of t and a refractive index n is held at an angle of $\Phi$ in a beam of light having, an, angle of diffusion $\theta$, then the astigmatism AS can be as follows:

$$As = -(t \cdot \phi^2 \cdot (n^2 - 1))/n^3$$

The astigmatism is moreover directional. Therefore, if the glass plate 2 is positioned so that an astigmatism is provided which is opposite to that of the light source 1; that is, so that the two astigmatisms cancel out each other, then light incident to the collimator lens 3 has no astigmatism, and the rays of light emerging from the collimator lens 3 are substantially parallel, having no astigmatism.

As was described above, the astigmatism can be eliminated by positioning the flat glass plate 2 so that is inclined between the light source 1 and the collimator lens 3. The glass plate 2 thus positioned produces a comatic aberration. The comatic aberration COMA is:

$$COMA = (t \cdot \theta^3 \cdot \phi \cdot (n^2 - 1))/2n^3$$

In practice, the comatic aberration obstructs the provision of a uniform optical distribution. Therefore the optical collimator should be free from the coma aberration.

As was described above, the glass plate 2 and the holder 4 are located between the light source 1 and the collimator lens 3, thus requiring a relatively long distance between the light source 1 and the collimator lens 3. Therefore, in order to obtain a predetermined angle of divergence $\theta$, it is necessary to increase the diameter of the collimator lens 3, and therefore the conventional optical collimator is unavoidably bulky.

SUMMARY OF THE INVENTION

Accordingly, an object of this invention is to eliminate the above-described deficiencies accompanying a conventional optical collimator.

More specifically, an object of the invention is to provide an optical collimator which is substantially free from comatic aberration, and can be miniaturized using a collimator lens which is relatively small in diameter.

The foregoing and other objects of the invention are achieved by the provision of an optical collimator for converting rays of light outputted by a light source into substantially parallel rays of light, which, according to the invention, comprises: front and rear collimator lenses obtained by dividing one collimator lens; and a transparent parallel flat plate held in an inclined position between said front and rear collimator lenses.

The nature, principle and utility of the invention will become more apparent from the following detailed description when read in conjunction with the accompanying drawings.

BRIEF DESCRIPTION OF THE INVENTION

DETAILED DESCRIPTION OF THE INVENTION

Figure 1:
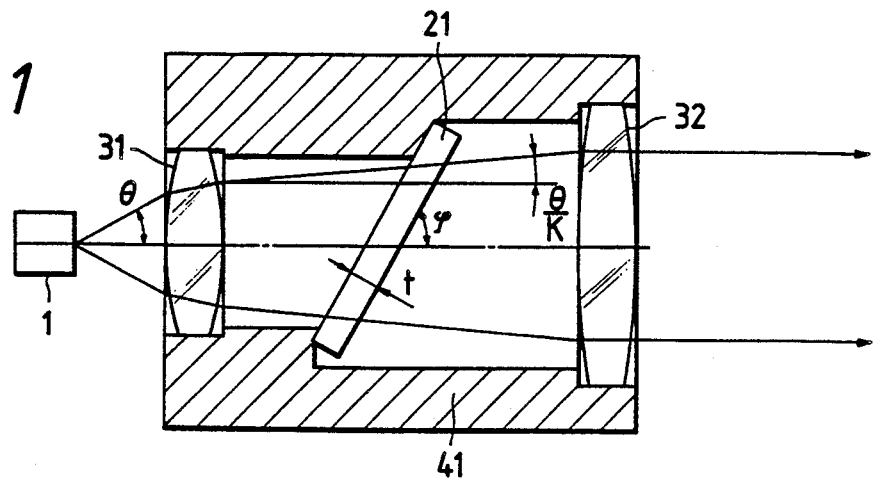
FIG. 1 is a sectional view showing a first example of an optical collimator according to this invention.

A first example of an optical collimator according to this invention, as shown in FIG. 1, comprises: a front collimator lens 31 for concentrating rays of light from a light source 1 with relatively high efficiency; a rear collimator lens 32 for converting divergent rays of light from the front collimator lens 31 into parallel rays; a transparent parallel flat plate 21 held in an inclined position between the front and rear collimator lenses 31 and 32; and a holder 41 holding the front and rear collimator lenses 31 and 32. The front and rear lenses 31 and 32 comprise divided segments of a single lens.

As was described before, when a flat plate having a thickness of t and a refractive index of n is held at an inclined angle of $\Phi$ in a bundle of rays having an angle of divergence of $\theta$, then the astigmatism AS and the comatic aberration COMA are as follows:

$$AS = -(t \cdot \phi^2 \cdot (n^2 - 1))/n^3$$

$$COMA = (t \cdot \theta^3 \cdot \phi \cdot (n^2 - 1))/2n^3$$

In the optical collimator, according to the present invention the flat plate 21 having a refractive index of n is held inclined at an angle of $\Phi$ in the bundle of rays having an angle of divergence $\theta/K$ (where $K > 1$) as shown in FIG. 1. Therefore, the resultant astigmatic difference is as follows, and is similar to the case of the conventional optical collimator described before:

$$AS = -(t \cdot \phi^2 \cdot (n^2 - 1))/n^3$$

However, the comatic aberration is:

$$COMA = t \cdot (\theta/k)^3 \cdot \Phi(n^2 - 1)/2n^3$$
$$= (1/k^3)(t \cdot \theta^3 \cdot \Phi(n^2 - 1))/2n^3$$

In the optical collimator of this invention, when compared with a conventional collimator, the comatic aberration is reduced as much as $1/k^3$. In other words, although the astigmatism is the same as that of the conventional optical collimator, the comatic aberration is reduced by $1/k^3$. Furthermore, in the optical collimator of the invention, the angle of divergence $\theta$ of the beam emerging from the front collimator lens 31 is small, $\theta/k$, and therefore when entering the rear collimator lens 32, the beam is not substantially increased in diameter. Accordingly, the rear collimator lens 32 is smaller in diameter than the collimator lens of a conventional optical collimator.

Figure 2:
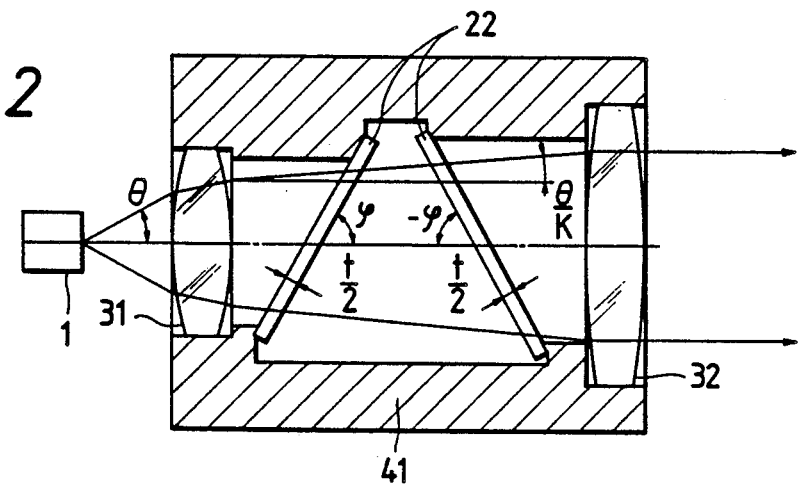
FIG. 2 is a sectional view showing a second example of the optical collimator according to the invention.
Figure 3:
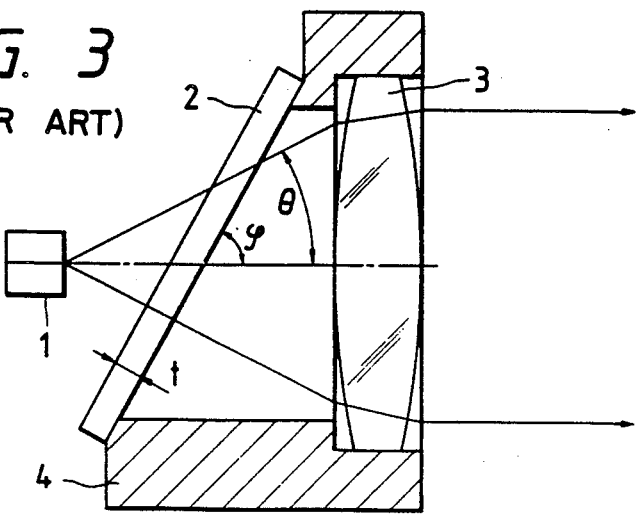
FIG. 3 is also a sectional view showing a conventional optical collimator.

A second example of the optical collimator according to the invention is shown in FIG. 2.

In the first example described above, one inclined parallel flat plate is held between the front and rear collimator lenses 31 and 32. In the second example, as shown in FIG. 2, two parallel flat plates are inclined towards each other between the front and rear collimator lenses 31 and 32. The second example of FIG. 2 is superior in characteristic to the first example of FIG. 1 as follows:

When, as shown in FIG. 2, two parallel flat plates 22 and 22 each having a thickness of t/2 and a refractive index of n are inclined toward each other at angles relative to the central longitudinal axis of $\pm\Phi$, respectively, between the front and rear collimator lenses 31 and 32, the resultant astigmatism is as follows:

$$AS = -(t \cdot \Phi^2 \cdot (n^2 - 1))/2n^3 - (t \cdot (-\Phi)^2 \cdot (n^2 - 1))/2n^3$$
$$= -(t \cdot \Phi^2 \cdot (n^2 - 1)/n^3$$

Accordingly, the astigmatism is the same as that in the conventional optical collimator; however, the comatic aberration COMA is as follows:

$$COMA = (t \cdot \theta^3 \cdot \Phi(n^2 - 1))/4n^3 +$$
$$(t \cdot \theta^3 \cdot (-\Phi) \cdot (n^2 - 1)/4n^3 = 0$$

That is, no comatic aberration occurs.

As was described above, in the optical collimator of the invention, the parallel flat plate is held inclined between the two collimator lenses obtained by dividing one collimator lens. Therefore, the comatic aberration is extremely small, and the resultant beam is corrected in astigmatism. Accordingly, in the optical collimator of the invention, the collimator lens diameter is small, when compared with the conventional optical collimator, and the size of the optical collimator can be miniaturized as much.

We claim:

1. An optical collimator for converting rays of light outputted by a light source into substantially parallel rays of light, comprising:
   front and rear collimator lenses obtained by dividing one collimator lens into two relatively smaller lenses, thereby reducing the angle of divergence of light between said front and rear collimator lenses; and
   an inclined transparent parallel flat plate held between said front and rear collimator lenses thereby reducing astigmatism.
   whereby an optical collimator structure of reduced size can be provided.

2. The optical collimator of claim 1, wherein said flat plate is comprised of a single piece of glass.

3. The optical collimator of claim 1, wherein said flat plate is composed of a pair of glass plates which are inclined relative to each other.

4. The optical collimator of claim 3, wherein said pair of glass plates are inclined in mutually opposite directions at substantially the same angle relative to a central longitudinal axis passing through said front and rear lenses.

5. The optical collimator of claim 1 wherein the diameter of said front collimator lens is less than the diameter of said rear collimator lens.

6. The optical collimator of claim 1 wherein the diameter of said front and rear lenses is less than the diameter of said one collimator lens.

7. The optical collimator of claim 6 wherein the diameter of said front collimator lens is less than the diameter of said rear collimator lens and wherein said front collimator lens operates as an input lens for said light and said rear collimator lens operates as an output lens for said light.

8. The optical collimator of claim 7 wherein said glass plate and said rear collimator lens are located within the focal length of said front collimator lens.

9. The optical collimator of claim 8 wherein said flat plate is comprised of a pair of glass plates which are inclined relative to each other.

10. The optical collimator of claim 9 wherein said pair of glass plates are inclined in mutually opposite directions at substantially the same angle relative to a central longitudinal axis passing through said front and rear lenses.

* * * * *